(12) United States Patent
Colburn

(10) Patent No.: US 7,788,850 B2
(45) Date of Patent: Sep. 7, 2010

(54) GROUND PLANTING POT

(76) Inventor: Everett Colburn, 9 Meadowood Dr., Franklin, NH (US) 03235

( * ) Notice: Subject to any disclaimer, the term of this patent is extended or adjusted under 35 U.S.C. 154(b) by 0 days.

(21) Appl. No.: 12/409,722

(22) Filed: Mar. 24, 2009

(65) Prior Publication Data
US 2010/0050508 A1 Mar. 4, 2010

Related U.S. Application Data

(60) Provisional application No. 61/190,319, filed on Aug. 28, 2008.

(51) Int. Cl.
*A01G 27/02* (2006.01)
(52) U.S. Cl. .................................. 47/73; 47/79
(58) Field of Classification Search ............... 47/65.5, 47/79
See application file for complete search history.

(56) References Cited

U.S. PATENT DOCUMENTS

| 1,317,569 | A | * | 9/1919 | Forster | 47/79 |
|---|---|---|---|---|---|
| 3,345,774 | A | | 10/1967 | Delbuguet | |
| 3,471,968 | A | | 10/1969 | Letz | |
| 4,128,965 | A | | 12/1978 | D'Hondt | |
| 4,922,653 | A | | 5/1990 | Stone | |
| 5,067,274 | A | | 11/1991 | Lewis | |
| 5,901,497 | A | | 5/1999 | Bulvin | |
| 6,254,049 | B1 | | 7/2001 | Goehly | |
| 6,345,470 | B1 | * | 2/2002 | Slaght et al. | 47/79 |
| 6,385,900 | B1 | | 5/2002 | George | |
| 6,418,663 | B1 | * | 7/2002 | Smith | 47/79 |
| 6,584,730 | B1 | * | 7/2003 | Mai | 47/79 |
| 7,017,299 | B1 | | 3/2006 | Speed et al. | |
| 7,225,585 | B2 | | 6/2007 | Zayeratabat | |
| 2006/0218862 | A1 | * | 10/2006 | Dyas | 47/86 |
| 2009/0194006 | A1 | * | 8/2009 | Duncan | 108/42 |

FOREIGN PATENT DOCUMENTS

| GB | 2093673 | A | * | 9/1982 |
|---|---|---|---|---|
| GB | 2244198 | A | * | 11/1991 |

OTHER PUBLICATIONS

"Dalem AU-16X Tomata Tray Growaid 12×12," Ace Hardware, May 13, 2009, http://www.acehardwareoutlet.com/(qszvvc3me53tbfvpdvc0ici0)/productDetails.aspx?SKU=7170640.

* cited by examiner

*Primary Examiner*—Francis T Palo
(74) *Attorney, Agent, or Firm*—Mesmer & Deleult, PLLC

(57) ABSTRACT

An in-ground planting pot apparatus for facilitating watering and fertilizing a plant having: a frustro-conical portion having a minimum diameter, a maximum diameter opposite the minimum diameter, and an outer surface; a curved lip portion circumscribing most of the maximum diameter and extending outwardly from, and having an outside diameter greater than, the maximum diameter, the curved lip portion starting on the outer surface and terminating at the same plane formed by the maximum diameter; and an elongated tray portion having a tray bottom that is co-planar with the start of the curved lip portion, and a tray rim starting from the tray bottom and terminating at the same plane formed by the maximum diameter and curved lip portion The apparatus can be inserted into soil with the minimum diameter down and a fraction of the frustro-conical portion remaining above ground, a plant may be planted in the middle, and then water and fertilizer dispensed into the frustro-conical, tray, and lip portions which direct water and fertilizer to the plant instead of the surrounding soil, thereby facilitating watering and fertilizing.

15 Claims, 3 Drawing Sheets

GROUND PLANTING POT

BACKGROUND OF THE INVENTION

1. Field of the Invention

The present invention relates generally to pots for growing plants.

2. Description of the Prior Art

It is well known in the gardening field that plants grow better with regular watering and fertilizing. The water and fertilizer is often distributed evenly over the entire garden area. The problem with this method is that the water and fertilizer also feeds unwanted weeds that compete with the plant for sun and nourishment. A consequence is that the desired plants get less water and the gardener must remove the weeds frequently.

One solution that has been tried is disclosed in U.S. Pat. No. 5,901,497 by Bulvin that issued on May 11, 1999. Bulvin discloses a water stake apparatus that has a narrow hollow stake with a funnel at the top, plant ties along the body, and exit holes near the bottom that get inserted into the soil. This type of apparatus is apparently only suited for vine-like plants, since a plant cannot be inserted inside the narrow stake. Also, this apparatus does nothing to contain the water or prevent the water from feeding weeds.

Another solution that has been tried is the GARDE-NEER™, otherwise known as the TOMATOR AUTOMA-TOR™, by Dalen Products, Inc. The Dalen apparatus is a shallow square tray with four built in spikes with holes in the bottoms surrounding a larger hole in the center. It is a complex apparatus that requires the user to press four elongated protrusions into the soil without breaking them. Also, the four protrusions restrict the size that the plant hole can be making it difficult to plant and risks injury to the plant as it grows.

Therefore, what is needed is an in-ground planting pot apparatus that can concentrate water and fertilizer near a plant's roots and provides plenty of access from the top for watering and bottom for root growth, yet prevents water and fertilizer from feeding unwanted weeds.

SUMMARY OF THE INVENTION

The invention is an apparatus that satisfies the need for an in-ground planting pot apparatus that can concentrate water and fertilizer near a plant's roots and provides plenty of access, yet prevents water and fertilizer from feeding unwanted weeds. The apparatus comprises a frusto-conical portion having a minimum diameter, a maximum diameter opposite the minimum diameter, and an outer surface; a curved lip portion circumscribing most of the maximum diameter and extending outwardly from, and having an outside diameter greater than, the maximum diameter, the curved lip portion starting on the outer surface and terminating at the same plane formed by the maximum diameter; and an elongated tray portion having a tray bottom that is co-planar with the start of the curved lip portion, and a tray rim starting from the tray bottom and terminating at the same plane formed by the maximum diameter and curved lip portion The apparatus can be inserted into soil with the minimum diameter down and a fraction of the frusto-conical portion remaining above ground, a plant may be planted in the middle, and then water and fertilizer dispensed into the frusto-conical, tray, and lip portions which direct water and fertilizer to the plant instead of the surrounding soil, thereby facilitating watering and fertilizing. These and other features, aspects, and advantages of the present invention will become better understood with regard to the following drawings, description, and claims.

DETAILED DESCRIPTION OF THE PREFERRED EMBODIMENT

The preferred embodiment of the present invention, illustrated in FIGS. 1-4, is an in-ground planting pot apparatus for facilitating watering and fertilizing a plant comprising: a frusto-conical portion having a minimum diameter, a maximum diameter opposite the minimum diameter, and an outer surface; a curved lip portion circumscribing most of the maximum diameter and extending outwardly from, and having an outside diameter greater than, the maximum diameter, the curved lip portion starting on the outer surface and terminating at the same plane formed by the maximum diameter; and an elongated tray portion having a tray bottom that is co-planar with the start of the curved lip portion, and a tray rim starting from the tray bottom and terminating at the same plane formed by the maximum diameter and curved lip portion. The apparatus can be inserted into soil with the minimum diameter down and a fraction of the frusto-conical portion remaining above ground. A plant may be planted in the middle, and then water and fertilizer dispensed into the frusto-conical portion, tray portion, and lip portion that directs water and fertilizer to the plant instead of the surrounding soil, thereby facilitating watering and fertilizing.

Figure 1:
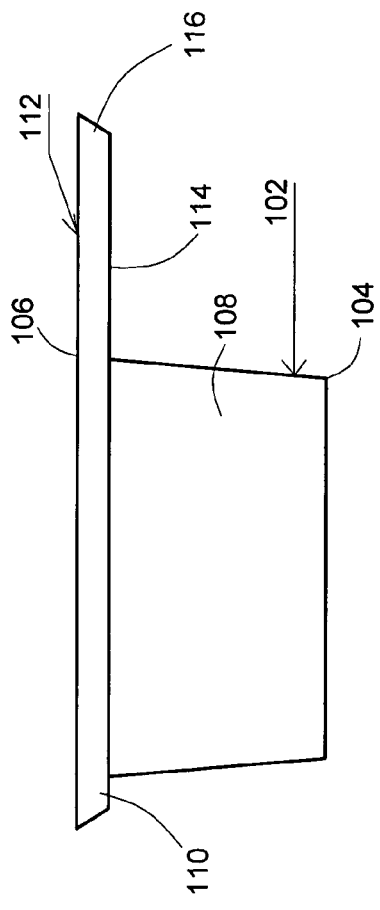
FIG. 1 is a side elevation of a pot according to the present invention.
Figure 2:
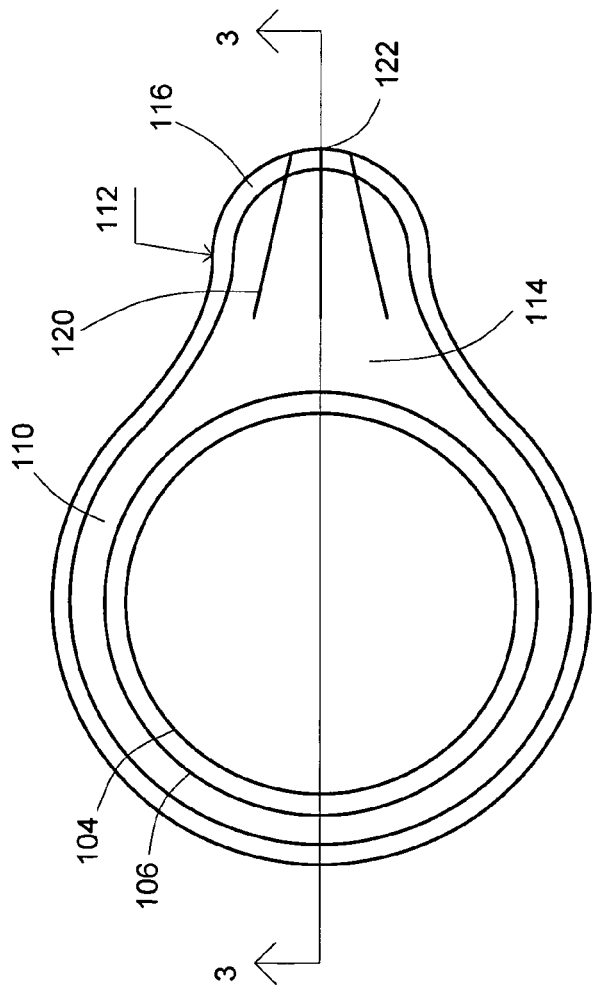
FIG. 2 is a plan view of the pot of FIG. 1.

Turning to FIGS. 1 and 2, the in-ground planting pot apparatus has three major parts: a frusto-conical section 102, a curved lip portion 110, and an elongated tray portion 112. The frusto-conical portion 102 comprises a minimum diameter 104, a maximum diameter opposite the minimum diameter 106, and an outer surface 108.

The curved lip portion 110 circumscribes most of the maximum diameter 106. It extends outwardly from, and has an outside diameter greater than, the maximum diameter 106. The curved lip portion starts on the outer surface 108 just below the maximum diameter 106, and terminates at the same plane formed by the maximum diameter 106.

The elongated tray portion 112 has a tray bottom 114 that is co-planar with the start of the curved lip portion 110. The elongated tray portion also has a tray rim 116 starting at the tray bottom 114 and terminating at the same plane formed by the maximum diameter 106 and curved lip portion 110. Preferably, the tray portion 112 blends into the curved lip portion 110 and frusto-conical portion 102 with large radiuses. The distal end 122 preferably also terminates in a large or full radius. This increases the strength and aesthetic appeal of the apparatus. At the ends of the radius fillets where the elongated tray portion meets the maximum and diameter 106 and curved lip portion 110, it can be seen that the elongated tray portion takes up approximately one quarter of their circumference, or one quadrant. The lip portion also angled outward for facilitating stacking the product during manufacturing and distribution.

Optionally, the elongated tray portion 112 also has at least one triangular stiffener 120. The stiffener 120 has one vertex near a distal end 122 of the elongated tray portion tray rim 116 and another vertex on the tray bottom 114. In the preferred embodiment, the apparatus has three stiffeners 120 that generally radiate from the distal end 122 of the elongated tray portion 112. The stiffeners increase the strength of the tray portion.

Figure 3:
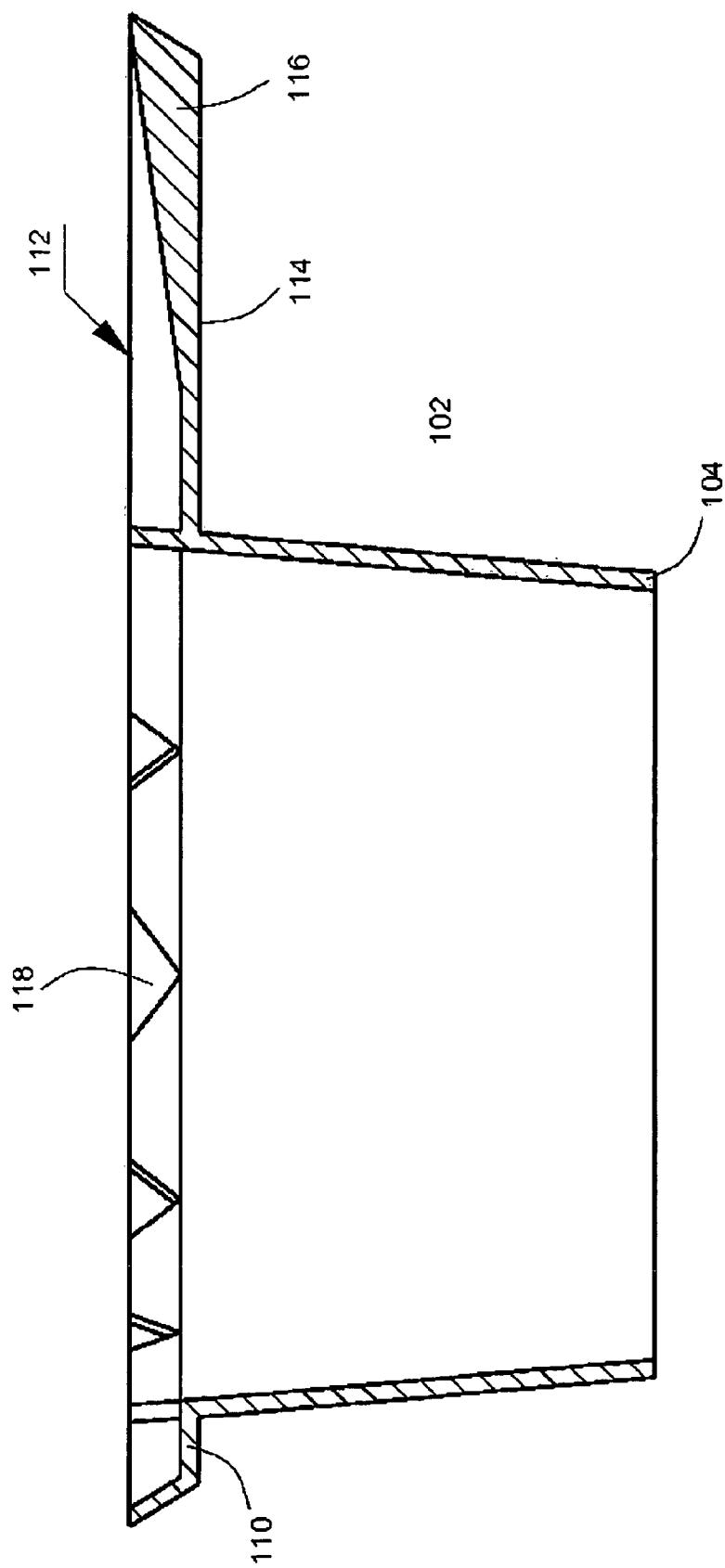
FIG. 3 is a sectional view of the pot of FIG. 1

FIG. 3 is a sectional view of the embodiment shown in FIGS. 1 and 2 that provides details of the sluices 118. The sluices are formed started from the plane of the maximum diameter 106 to the start of the curved lip portion 110. The sluices 118 can be wedge-shaped as shown, although other shapes could be used. The sluices 118 permit water and fertilizer in the lip 110 and tray portion 112 to flow into the frusto-conical portion 102 in a controlled manner.

Figure 4:
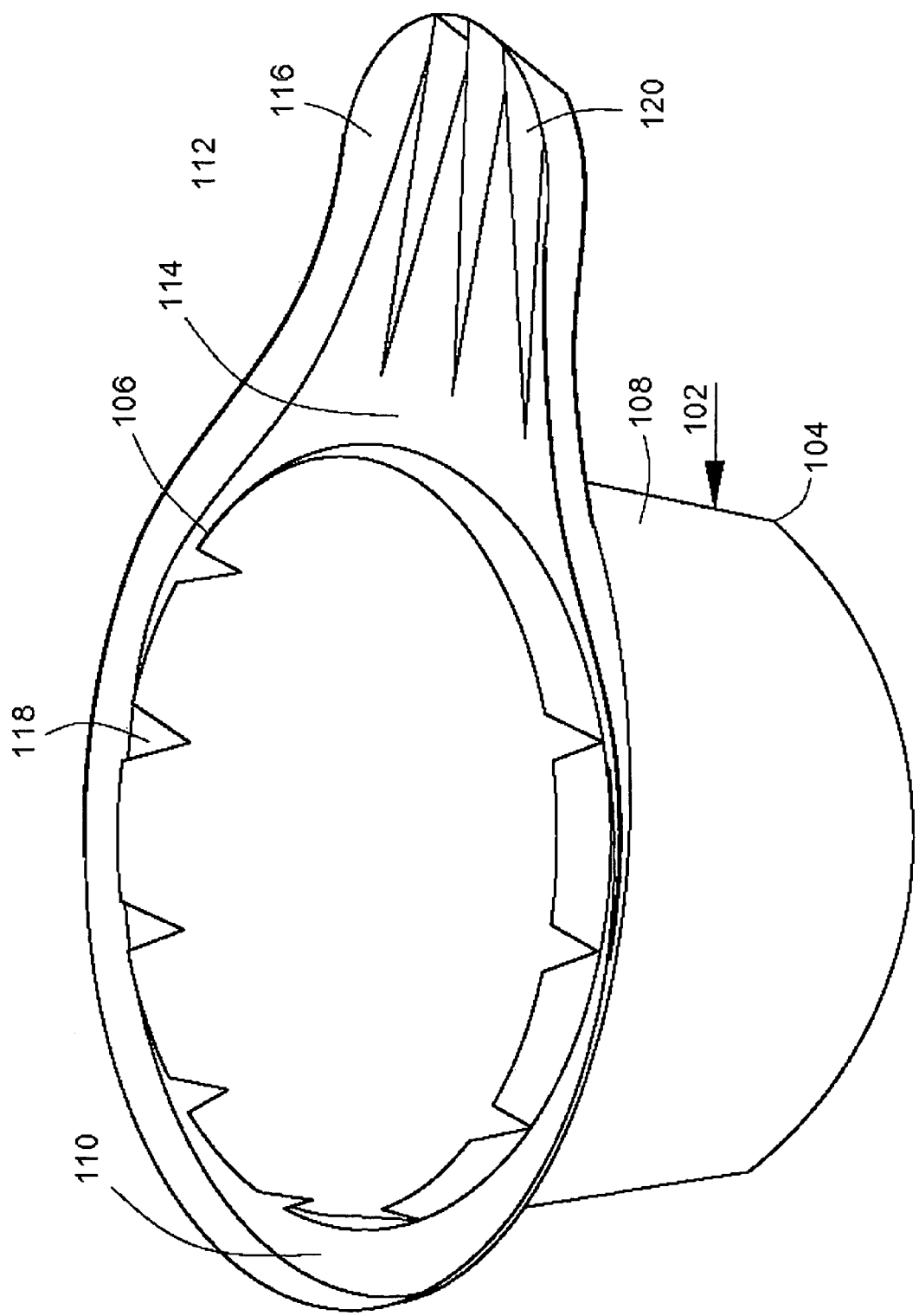
FIG. 4 is an orthogonal view of the pot of FIG. 1

FIG. 4 shows an orthogonal view of the embodiment of FIGS. 1-3. In this view, one can see that there are only sluices 118 outside the elongated tray portion 112 quadrant. This is an optional embodiment, and sluices could also be present within the quadrant. In FIG. 4 one will also notice that nine sluices 118 are provided. Other quantities of sluices could be provided as well.

The apparatus can be made of several different materials, as can be appreciated by those having skill in the art. However, in the preferred embodiment, the material is polypropylene.

The exact dimensions of the pot apparatus of the present invention can vary, but the ratios of its features have been shown to provide the benefits of the present invention.

For example, the ratio of the maximum diameter 106 to the minimum diameter 104 is preferably about 1.1.

The ratio of the maximum diameter 106 to the height of the frusto-conical portion 102 is preferably about 1.7.

The ratio of the maximum diameter 106 to the height of the frusto-conical portion 102 at the bottom of the sluices 118 is preferably about 2.0.

The ratio of the maximum diameter 106 to the length of the elongated tray portion 112 is preferably between about 1.75 and 1.88.

The ratio of the maximum diameter 106 to the width of the elongated tray portion is preferably between about 2.09 and 2.46.

The ratio of the maximum diameter to the height of the curved lip portion is preferably about 13.

In operation, a user will insert the apparatus into soil with the minimum diameter 104 down. A fraction of the frusto-conical portion 102 will remain above ground. The user then plants a plant or seed or the like in the middle of apparatus. Water or water mixed with fertilizer can be dispensed into the frusto-conical portion 102, elongated tray portion 112, and/or lip portion 110. They will direct the water or water mixture through the sluices 118 toward the plant instead of the surrounding soil. In this way, the liquid is concentrated at the plant and its roots. Water and fertilizer do not run off and feed weeds that would compete with the plant. However, the plant has access to deep soil to grow its roots, unlike a typical pot with a closed bottom. As a result, plants that have been raised with the apparatus of the present invention have grown much bigger and faster than without the apparatus.

The shape of the frusto-conical section is selected to enclose the water near the plant, yet have a shape that can be stacked during manufacture and distribution. The apparatuses are preferably sold in lots of three, five, ten or the like.

The lip and elongated tray portion make it easier to dispense water to the plant, especially after the plant has grown bushy or large. The lip and tray portion can also hold a meaningful quantity of water and gently dispense it to the roots of the plant, without requiring the user to wait and slowly pour the water. The apparatus makes watering and fertilizing fast and efficient and produces superior results in the form of accelerated growth and lack of weeds. The apparatus is ideally suited for growing tomatoes, although any other plant can be grown.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An in-ground planting pot apparatus for facilitating watering and fertilizing a plant comprising:
a frusto-conical portion comprising:
a minimum diameter defining an opening in the pot apparatus,
a maximum diameter opposite the minimum diameter, and
an outer surface;
a curved lip portion circumscribing most of the maximum diameter and extending outwardly from, and having an outside diameter greater than, the maximum diameter, the curved lip portion starting on the outer surface and terminating at the same plane formed by the maximum diameter; and
an elongated tray portion comprising:
a tray bottom that is co-planar with the start of the curved lip portion, and
a tray rim starting from the tray bottom and terminating at the same plane formed by the maximum diameter and curved lip portion, whereby the apparatus can be inserted into soil with the minimum diameter down and a fraction of the frusto-conical portion remaining above ground, a plant may be planted in the middle, and then water and fertilizer dispensed into the frusto-conical, tray, and lip portions which direct water and fertilizer to the plant instead of the surrounding soil, thereby facilitating watering and fertilizing.

2. The apparatus of claim 1, the frusto-conical portion comprising a plurality of sluices from the maximum diameter to the start of the curved lip portion, thereby permitting water and fertilizer in the lip portion to flow into the frusto-conical portion.

3. The apparatus of claim 2, wherein the sluices are substantially wedge-shaped.

4. The apparatus of claim 2, wherein the sluices are only present outside the quadrant of the frusto-conical portion maximum diameter having the elongated tray portion.

5. The apparatus of claim 4, wherein nine sluices are present.

6. The apparatus of claim 4, wherein the sluices in the three remaining quadrants are evenly spaced.

7. The apparatus of claim 1 further comprising a plurality of triangular stiffeners each having one vertex near a distal end of the elongated tray portion tray rim and another vertex on the tray bottom for increasing the strength of the tray portion.

8. The apparatus of claim 7 having three stiffeners.

9. The apparatus of claim 1, wherein the ratio of the maximum diameter to the height of the frusto-conical portion is 1.7.

10. The apparatus of claim 2, wherein the ratio of the maximum diameter to the height of the frusto-conical portion bottom of the sluices is 2.0.

11. The apparatus of claim 1, wherein the ratio of the maximum diameter to the length of the elongated tray portion is between 1.75 and 1.88.

12. The apparatus of claim 1, wherein the ratio of the maximum diameter to the width of the elongated tray portion is between 2.09 and 2.46.

13. The apparatus of claim 1, wherein the ratio of the maximum diameter to the height of the curved lip portion is 13.

14. The apparatus of claim 1, wherein the apparatus is made of polypropylene.

15. The apparatus of claim 1 wherein the ratio of the maximum diameter to the minimum diameter is 1.1.

* * * * *